US010478814B2

United States Patent
Koop et al.

(10) Patent No.: US 10,478,814 B2
(45) Date of Patent: Nov. 19, 2019

(54) CAESIUM SELECTIVE RESIN

(71) Applicant: LANXESS Deutschland GmbH, Cologne (DE)

(72) Inventors: Bernd Koop, Cologne (DE); Reinhold Klipper, Cologne (DE); Stefan Neumann, Leverkusen (DE); Pierre Vanhoorne, Monheim (DE); Jenny Barbier, Cologne (DE); Tian Lei Yang, Shanghai (CN)

(73) Assignee: LANXESS Deutschland GmbH, Cologne (DE)

( * ) Notice: Subject to any disclaimer, the term of this patent is extended or adjusted under 35 U.S.C. 154(b) by 39 days.

(21) Appl. No.: 15/741,847

(22) PCT Filed: Jul. 5, 2016

(86) PCT No.: PCT/EP2016/065841
§ 371 (c)(1),
(2) Date: Jan. 4, 2018

(87) PCT Pub. No.: WO2017/005741
PCT Pub. Date: Jan. 12, 2017

(65) Prior Publication Data
US 2018/0193828 A1  Jul. 12, 2018

(30) Foreign Application Priority Data
Jul. 6, 2015  (EP) .................................... 15175385

(51) Int. Cl.
*B01J 41/14*  (2006.01)
*G21F 9/12*  (2006.01)
*B01J 41/07*  (2017.01)
*B01J 47/00*  (2017.01)
*C02F 1/42*  (2006.01)
*B01J 47/016*  (2017.01)
*C02F 101/10*  (2006.01)
*C02F 103/02*  (2006.01)

(52) U.S. Cl.
CPC ............... *B01J 41/14* (2013.01); *B01J 41/07* (2017.01); *B01J 47/016* (2017.01); *C02F 1/42* (2013.01); *G21F 9/12* (2013.01); *C02F 2001/422* (2013.01); *C02F 2101/10* (2013.01); *C02F 2103/023* (2013.01)

(58) Field of Classification Search
CPC .......... B01J 41/14; B01J 41/07; B01J 47/016; G21F 9/12; C02F 1/42; C02F 2001/422; C02F 2101/10; C02F 2103/023
USPC ............................................................ 521/32
See application file for complete search history.

(56) References Cited

U.S. PATENT DOCUMENTS

| 4,382,124 | A |   | 5/1983  | Meitzner et al. |
|-----------|---|---|---------|-----------------|
| 4,419,245 | A |   | 12/1983 | Barrett et al.  |
| 4,427,794 | A |   | 1/1984  | Lange et al.    |
| 4,444,961 | A |   | 4/1984  | Timm            |
| 5,601,722 | A | * | 2/1997  | Tanihara ................. B01J 41/04 210/670 |
| 7,282,153 | B2|   | 10/2007 | Barrett et al.  |

FOREIGN PATENT DOCUMENTS

| EP | 0481603 | 4/1992 |
| WO | WO1993/012167 | 6/1993 |
| WO | WO-2007101584 A2 * | 9/2007 ............. G21C 19/46 |

OTHER PUBLICATIONS

Koichi Tanihara: "Preparation of Insoluble Hexacyanoferrate(II)—Macroporous Ion Exchange Resin Composites and Comparison of Their Performance as a Regenerable Ion Exchanger for Cesium", Nippon Kagaku Kaishi, Mar. 6, 1996 (Mar. 6, 1996), (Year: 1996).*
"Amberlite IRA96", Jan. 1, 2014 (Jan. 1, 2014), Seiten 1-2, XP055241556, (2014).*
Tanihara et al. "Preparation of Insoluble Hexacyanoferrate(II)—Macroporous Ion Exchange Resin Composites and Comparison of Their Performance as a Regenerable Ion Exchanger for Cesium", Nippon Kagaku Kaishi, Mar. 6, 1996 (Mar. 6, 1996), Seiten 835-841, XP055241540, Japan. (Year: 1996).*
"Amberlite IRA96", Jan. 1, 2014 (Jan. 1, 2014), Seiten 1-2, XP055241556., (Year: 2014).*
European Search Report from Corresponding European Application No. 14175385.2 dated Jan. 14, 2016, 3 pages.
International Search Report from Corresponding Application No. PCT/EP2016/065841 dated Aug. 31, 2016, 3 pages.

* cited by examiner

*Primary Examiner* — Michael Bernshteyn

(57) ABSTRACT

The invention relates to ion exchangers laden with transition metal hexacyanoferrate complexes, to processes for the production thereof and to the use of these ion exchangers for removal and purification of cesium ions.

11 Claims, No Drawings

CAESIUM SELECTIVE RESIN

The invention relates to ion exchangers laden with transition metal hexacyanoferrate complexes, to processes for the production thereof and to the use of these ion exchangers for removal and purification of cesium ions.

The selective separation or purification of cesium is an industrial topic for the purposes of production of same but also for purification of aqueous solutions. Particularly in the cooling water of nuclear power plants but also in reactor accidents large quantities of water contaminated with radioactive isotopes of cesium are often generated and said isotopes must be removed before this water can be returned to the environment.

Removal or enrichment of cesium may be achieved by different processes. Thus, EP-A 0909447 describes the production of a granular cobalt hexacyanoferrate complex with which radioactive cesium can be removed from aqueous solutions in a column process. A disadvantage of this process is that the cobalt hexacyanoferrate complex formed is not abrasion-resistant and blocks the column effluents.

Nuclear Engineering and Technology, 2008, Vol. 40, No. 6, p. 489-496, Journal of Nuclear Materials, 2009, Vol. 384, p. 146-152 and Journal of Hazardous Materials, 2009, Vol. 166, p. 1148-1153 disclose that strongly basic anion exchangers having quaternary ammonium groups which are initially contacted with potassium hexacyanoferrate and then contacted with cobalt or nickel nitrate solutions are suitable for cesium adsorption. A disadvantage of these charged, strongly basic anion exchangers is that these ion exchangers are not efficient and a satisfactory capacity for cesium ions cannot be achieved.

Composite ion exchangers based on polyacrylonitrile using ammonium molybdophosphate are disclosed in Journal of Radioanalytical and Nuclear Chemistry, 1990, Vol. 140, p. 15-21, or Journal of Radioanalytical and Nuclear Chemistry, 2013, Vol. 296, p. 369-374.

These composite ion exchangers are more hydrophobic than ion exchangers based on functionalized polystyrene copolymers and thus have slower kinetics.

There is therefore a need to provide ion exchangers for adsorption of cesium with which the disadvantages of the prior art can be overcome.

It has now been found that, surprisingly, special ion exchangers, in particular weakly basic anion exchangers based on polystyrene copolymers that have been laden with transition metal hexacyanoferrate complexes, adsorb cesium ions in large amounts.

The invention accordingly provides ion exchangers containing polymer having functional groups of formula (I)

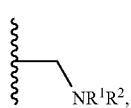

(I)

wherein ▼ is a polystyrene copolymer scaffold and
R$^1$ and R$^2$ may be identical or different and independently of one another represent C$_1$-C$_6$-alkyl or H,
and at least one transition metal hexacyanoferrate complex.

R$^1$ and R$^2$ may be identical or different and independently of one another preferably represent methyl, ethyl and hydrogen. It is particularly preferable when R$^1$ and R$^2$ independently of one another represent methyl and ethyl. It is very particularly preferable when R$^1$ and R$^2$ represent methyl.

Employed polystyrene copolymers include for example and preferably copolymers of styrene, vinyltoluene, ethylstyrene, α-methylstyrene, chlorostyrene, or chloromethylstyrene and mixtures of these monomers with polyvinylaromatic compounds (crosslinkers), such as for example and preferably divinylbenzene, divinyltoluene, trivinylbenzene, divinylnaphthalene or trivinylnaphthalene.

The polystyrene copolymer scaffold employed is particularly preferably a styrene/divinylbenzene crosslinked copolymer.

In the polystyrene copolymer scaffold the —CH$_2$—NR$_1$R$_2$ group is bonded to a phenyl radical.

The ion exchangers according to the invention preferably have a macroporous structure.

The terms microporous or gel-form/macroporous have already been described in detail in the literature, for example, in Seidl, Malinsky, Dusek, Heitz, Adv. Polymer Sci., 1967, Vol. 5, pp. 113 to 213. The possible methods of measurement for macroporosity, for example mercury porosimetry and BET determination, are likewise described therein. The pores of the macroporous bead polymers of the ion exchangers according to the invention generally and preferably have a diameter of 20 nm to 100 nm.

The ion exchangers according to the invention preferably have a monodisperse distribution.

In the present application, monodisperse materials are those where at least 90 volume % or mass % of the particles have a diameter within the interval of ±10% of the most common diameter.

For example for a substance having a most common diameter of 0.5 mm at least 90 volume % or mass % is within a size interval between 0.45 mm and 0.55 mm; in the case of a substance having a most common diameter of 0.7 mm at least 90 volume % or mass % is within a size interval between 0.77 mm and 0.63 mm.

Employable transition metal hexacyanoferrate complexes include for example and preferably any complexes of divalent and trivalent transition metals and alkali metal and/or ammonium hexacyanoferrates. As is well-known, transition metals are all chemical elements having atomic numbers of 21 to 30, 39 to 48, 57 to 80 and 89 to 112. Transition metals in the context of the invention are preferably Co, Cu, Ni, Fe or Zn. The transition metals are particularly preferably cobalt and nickel. The transition metal is yet more preferably cobalt; in particular the transition metal is a divalent cobalt cation. Employable alkali metal and ammonium hexacyanoferrates include, for example, alkali metal and ammonium hexacyanoferrates (II) and (III) and also mixtures of different alkali metal hexacyanoferrates (II) and (III) and/or ammonium hexacyanoferrates (II) and (III). Alkali metal and ammonium hexacyanoferrates that may be mentioned include for example and preferably K$_3$[Fe(CN)$_6$], K$_4$[Fe(CN)$_6$], Na$_3$[Fe(CN)$_6$], Na$_4$[Fe(CN)$_6$], Na$_2$K$_2$[Fe(CN)$_6$], Li$_3$[Fe(CN)$_6$], Li$_4$[Fe(CN)$_6$], Li$_2$(NH$_4$)$_2$[Fe(CN)$_6$], Na$_3$K[Fe(CN)$_6$], (NH$_4$)$_3$[Fe(CN)$_6$], (NH$_4$)$_4$[Fe(CN)], NaK$_2$[Fe(CN)$_6$], LiK$_2$[Fe(CN)$_6$] or (NH$_4$)K$_2$[Fe(CN)$_6$] and hydrates and mixtures thereof. It is particularly preferable to employ alkali metal hexacyanoferrates (II).

It is very particularly preferable to employ potassium hexacyanoferrate (II) or sodium hexacyanoferrate (II) and hydrates thereof or mixtures of these compounds. The transition metal hexacyanoferrate complexes are preferably transition metal hexacyanoferrate (II) complexes. Cobalt hexacyanoferrate (II) complexes are particularly preferred.

The ion exchangers according to the invention generally and preferably contain between 0.1 and 15 wt % of transition metal based on the dry weight of the ion exchanger. The ion exchangers according to the invention particularly preferably contain between 0.5 wt % and 10 wt % of transition metal based on the dry weight of the ion exchanger. The ion exchangers according to the invention generally and preferably contain between 0.1 and 15 wt % of iron based on the dry weight of the ion exchanger. The ion exchangers according to the invention particularly preferably contain between 0.5 wt % and 10 wt % of iron based on the dry weight of the ion exchanger. The amount of substance ratio of transition metal to iron in the ion exchanger according to the invention is preferably between 10:1 and 1:10. The amount of substance ratio of transition metal to iron is particularly preferably between 2:1 and 1:2. If the transition metal is iron then the sum of the amount of iron from the proportion as transition metal and from the proportion of hexacyanoferrate complex present in the ion exchanger according to the invention is preferably between 0.6 wt % and 25 wt % based on the dry weight of the ion exchanger.

The invention comprises a process for producing the ion exchangers according to the invention, in which an ion exchanger containing polymer having functional groups of formula (I)

(I)

wherein ▌ represents a polystyrene copolymer scaffold and $R^1$ and $R^2$ may be identical or different and independently of one another represent $C_1$-$C_6$-alkyl or H, is reacted in the presence of at least one transition metal salt and in the presence of at least one alkali metal or ammonium hexacyanoferrate in an aqueous medium.

The invention further comprises a process for producing the ion exchangers according to the invention, in which in a step 1.) an ion exchanger containing polymer having functional groups of the formula (I)

(I)

wherein ▌ represents a polystyrene copolymer scaffold and $R^1$ and $R^2$ may be identical or different and independently of one another represent $C_1$-$C_6$-alkyl or H, is contacted with at least one transition metal salt in an aqueous medium and, in a step 2.), the transition metal-laden ion exchanger from step 1.) is reacted with at least one alkali metal or ammonium hexacyanoferrate in an aqueous medium.

Employable transition metal salts include for example and preferably any salts of organic or inorganic acids, for example and preferably sulfuric acid, nitric acid, hydrochloric acid, hydrofluoric acid, hydrobromic acid, oxalic acid, acetic acid and phosphoric acid, such as in particular, sulfates, phosphates, fluorides, chlorides, bromides, oxalates, acetates or nitrates with divalent or trivalent transition metals, preferably Co, Cu, Ni, Fe or Zn. It is particularly preferable to employ cobalt(II) sulfate, cobalt(II) chloride, cobalt(II) bromide, nickel(II) nitrate, nickel(II) sulfate, nickel(II) chloride, nickel(II) bromide, cobalt(III) sulfate, cobalt(III) chloride, cobalt(III) bromide, nickel(III) nitrate, nickel(III) sulfate, nickel(II) chloride, nickel(III) bromide, cobalt(II) nitrate or cobalt(III) nitrate or hydrates thereof or mixtures of these transition metal salts. It is preferable to employ divalent transition metal salts. It is very particularly preferable to employ cobalt(II) chloride hexahydrate, cobalt (II) sulfate heptahydrate and cobalt(II) nitrate heptahydrate.

Employable as alkali metal and ammonium hexacyanoferrates are for example alkali metal and ammonium hexacyanoferrates (II) and (III) and also mixtures of different alkali metal hexacyanoferrates (II) and (III) and/or ammonium hexacyanoferrates (II) and (III). Alkali metal and ammonium hexacyanoferrates that may be mentioned include for example and preferably $K_3[Fe(CN)_6]$, $K_4[Fe(CN)_6]$, $Na_3[Fe(CN)_6]$, $Na_4[Fe(CN)_6]$, $Na_2K_2[Fe(CN)_6]$, $Li_3[Fe(CN)_6]$, $Li_4[Fe(CN)_6]$, $Li_2(NH_4)_2[Fe(CN)_6]$, $Na_3K[Fe(CN)_4]$, $(NH_4)_3[Fe(CN)_6]$, $(NH_4)_4[Fe(CN)_6]$, $NaK_2[Fe(CN)_6]$, $LiK_2[Fe(CN)_6]$ or $(NH_4)K_2[Fe(CN)_6]$ and hydrates and mixtures thereof. It is particularly preferable to employ alkali metal hexacyanoferrates (II). It is very particularly preferable to employ potassium hexacyanoferrate (II) and sodium hexacyanoferrate (II) and hydrates thereof or mixtures of these compounds.

Aqueous medium is in the context of the invention a mixture of water and optionally further organic aromatic or aliphatic solvents. The aqueous medium preferably has a water content of >95 wt %, particularly preferably >99 wt %, based on the total amount of aqueous medium. It is very particularly preferable to employ water having a conductivity s 1.1 µS/cm measured at 20° C.

It is possible to contact the ion exchanger containing polymer having functional groups of formula (I) with the transition metal hexacyanoferrate complex to produce the ion exchanger according to the invention. In the context of this process the transition metal salts are contacted with the alkali metal or ammonium hexacyanoferrate in an aqueous medium. The ion exchanger containing polymer having functional groups of formula (I) is then added to this solution. The ion exchanger is generally washed with deionized water. However, it may also be used without further aftertreatment.

It is equally possible initially to contact the ion exchanger containing polymer having functional groups of formula (I) with at least one alkali metal hexacyanoferrate or/and the ammonium hexacyanoferrate initially in a step 1.) and then to react this modified ion exchanger with at least one transition metal salt in a step 2.). The ion exchanger is generally washed with deionized water. However, it may also be used without further aftertreatment.

It is likewise possible to contact the ion exchanger containing polymer having functional groups of formula (I) with at least one transition metal salt in an aqueous medium in a step 1.) and to react the charged ion exchanger from step 1.) with at least one alkali metal or ammonium hexacyanoferrate in an aqueous medium in a step 2.). The ion exchanger prepared according to step 2.) is generally washed out with deionized water. However, it may also be used without further aftertreatment.

Step 2.) may generally be performed at different pHs, in alkaline or acidic conditions. However, it is preferable to perform the reaction at a pH of 5 to 8, particularly preferably at pH 6.5 to 7.5.

Production is preferably effected when the ion exchanger containing polymer having functional groups of formula (I) is contacted with at least one transition metal salt in an aqueous medium in a step 1.) and the charged ion exchanger from step 1.) is reacted with at least one alkali metal or ammonium hexacyanoferrate in an aqueous medium in a step 2.). It is preferable when the ion exchanger is then washed out with deionized water. The present invention likewise comprises the ion exchangers produced by these processes.

Production of the polymers having functional groups of formula (I) employed in the process is preferably effected by:
a) converting monomer droplets composed of at least one monovinylaromatic compound and at least one polyvinyaromatic compound and at least one initiator into a bead polymer,
b) phthallmidomethylating the bead polymer from step a) with phthalimide derivatives,
c) converting the phthalimidomethylated bead polymer from step b) into an aminomethylated bead polymer and optionally in a further step
d) reacting the aminomethylated bead polymer by alkylation to afford ion exchangers containing secondary and/or tertiary amino groups.

In process step a) at least one monovinylaromatic compound and at least one polyvinylaromatic compound are employed. However, it is also possible to employ mixtures of two or more monovinylaromatic compounds and mixtures of two or more polyvinylaromatic compounds.

Preferably employed as monovinylaromatic compounds in the context of the present invention in process step a) are styrene, vinyl toluene, ethyistyrene, α-methylstyrene, chlorostyrene or chloromethyistyrene.

It is especially preferable to employ styrene or mixtures of styrene with the abovementioned monomers, preferably with ethyistyrene.

Preferred polyvinylaromatic compounds in the context of the present invention for process step a) are divinylbenzene, divinyltoluene, trivinylbenzene, divinylnaphthalene, or trivinylnaphthalene, especially preferably divinylbenzene.

The polyvinylaromatic compounds are preferably employed in amounts of 1-20 wt %, particularly preferably 2-12 wt %, especially preferably 4-10 wt %, based on the monomer or the mixture thereof with further monomers. The type of polyvinylaromatic compound (crosslinker) is selected with regard to the later use of the bead polymer. If divinylbenzene is employed, commercial grades of divinylbenzene containing not only the isomers of divinylbenzene but also ethylvinylbenzene are sufficient.

The term "bead polymer" in the context of the invention is a spherical crosslinked polymer.

Macroporous bead polymers are preferably formed by addition of inert materials, preferably at least one porogen, to the monomer mixture in the course of polymerization in order to produce a macroporous structure in the bead polymer. Especially preferred porogens are hexane, octane, isooctane, isododecane, methyl ethyl ketone, butanol or octanol and isomers thereof. Especially suitable organic substances are those which dissolve in the monomer but are poor solvents or swellants for the bead polymer (precipitants for polymers), for example aliphatic hydrocarbons (Farbenfabriken Bayer DBP 1045102, 1957; DBP 1113570, 1957).

U.S. Pat. No. 4,382,124 employs as a porogen the alcohols having 4 to 10 carbon atoms likewise to be used with preference in the context of the present invention for production of monodisperse, macroporous styrene/divinylbenzene-based bead polymers. An overview of the methods of production of macroporous bead polymers is also given.

It is preferable when at least one porogen is added in process step a).

The bead polymers prepared according to process step a) may be produced in heterodisperse or monodisperse form.

The production of heterodisperse bead polymers is accomplished by general methods known to those skilled in the art, for example using suspension polymerization.

It is preferable to produce monodisperse bead polymers in process step a).

In a preferred embodiment of the present invention, process step a) employs microencapsulated monomer droplets in the production of mono-dispersed bead polymers.

Suitable materials for microencapsulation of the monomer droplets include those known for use as complex coacervates, in particular polyesters, natural and synthetic polyamides, polyurethanes or polyureas.

A preferably employed natural polyamide is gelatin. This is employed especially as a coacervate and complex coacervate. Gelatin-containing complex coacervates in the context of the invention are to be understood as meaning especially combinations of gelatin with synthetic polyelectrolytes. Suitable synthetic polyelectrolytes are copolymers having incorporated units of, for example, maleic acid, acrylic acid, methacrylic acid, acrylamide and methacrylamide. Particular preference is given to using acrylic acid and acrylamide. Gelatin-containing capsules may be hardened with conventional hardeners, for example formaldehyde or glutardialdehyde. The encapsulation of monomer droplets with gelatin, gelatin-containing coacervates and gelatin-containing complex coacervates is described in detail in EP 0 046 535 A. Methods of encapsulation with synthetic polymers are known. Preference is given to an interfacial condensation in which a reactive component (in particular an isocyanate or an acid chloride) dissolved in the monomer droplet is reacted with a second reactive component (in particular an amine) dissolved in the aqueous phase.

The heterodisperse or optionally microencapsulated, monodisperse monomer droplets contain at least one initiator or mixtures of initiators (initiator combination) to induce the polymerization. Initiators preferred for the process according to the invention are peroxy compounds, especially preferably dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azo compounds such as 2,2'-azobis(isobutyronitrile) or 2,2'-azobis(2-methylisobutyronitrile).

The initiators are preferably employed in amounts of 0.05 to 2.5 wt %, particularly preferably 0.1 to 1.5 wt %, based on the monomer mixture.

The optionally monodisperse, microencapsulated monomer droplet may optionally also contain up to 30 wt % (based on the monomer) of crosslinked or uncrosslinked polymer.

Preferred polymers derive from the aforementioned monomers, particularly preferably from styrene.

In the production of monodisperse bead polymers in process step a) the aqueous phase in a further preferred embodiment may comprise a dissolved polymerization inhibitor.

Suitable inhibitors in this case include both inorganic and organic substances. Preferred inorganic inhibitors are nitrogen compounds, especially preferably hydroxylamine, hydrazine, sodium nitrite and potassium nitrite, salts of phosphorous acid such as sodium hydrogen phosphite, and sulfur compounds such as sodium dithionite, sodium thiosulfate, sodium sulfite, sodium bisulfite, sodium thiocyanate and ammonium thiocyanate.

Examples of organic inhibitors are phenolic compounds such as hydroquinone, hydroquinone monomethyl ether, resorcinol, catechol, tert-butylcatechol, pyrogallol and condensation products of phenols with aldehydes. Further preferred organic inhibitors are nitrogen compounds. Especially preferred are hydroxylamine derivatives, for example N,N-diethylhydroxylamine, N-isopropythydroxylamine and sulfonated or carboxylated N-alkylhydroxylamine or N,N-dialkylhydroxylamine derivatives, hydrazine derivatives, for example N,N-hydrazinodiacetic acid, nitroso compounds, for example N-nitrosophenythydroxylamine, N-nitrosophenylhydroxylamine ammonium salt or N-nitrosophenylhydroxylamine aluminum salt. The concentration of the inhibitor is 5-1000 ppm (based on the aqueous phase), preferably 10-500 ppm, particularly preferably 10-250 ppm.

The polymerization of the optionally microencapsulated, monodisperse monomer droplets to afford the monodisperse bead polymer is optionally/preferably effected in the presence of one or more protective colloids in the aqueous phase. Suitable protective colloids are natural or synthetic water-soluble polymers, preferably gelatin, starch, polyvinyl alcohol, polyvinylpyrrolidone, polyacrylic acid, polymethacrylic acid or copolymers of (meth)acrylic acid and (meth)acrylic esters. Preference is further given to cellulose derivatives, especially cellulose esters and cellulose ethers, such as carboxymethyl cellulose, methyl hydroxyethyl cellulose, methyl hydroxypropyl cellulose and hydroxyethyl cellulose. Gelatin is especially preferred. The usage amount of the protective colloids is generally 0.05 to 1 wt % based on the aqueous phase, preferably 0.05 to 0.5 wt %.

The polymerization to afford the monodisperse bead polymer in an alternative preferred embodiment may be conducted in the presence of a buffer system. Preference is given to buffer systems which adjust the pH of the aqueous phase at the start of the polymerization to a value between 14 and 6, preferably between 12 and 8. Under these conditions, protective colloids having carboxylic acid groups are fully or partly present in the form of salts. This has a favourable effect on the action of the protective colloids. Particularly suitable buffer systems contain phosphate or borate salts. The terms "phosphate" and "borate" in the context of the invention also include the condensation products of the ortho forms of corresponding acids and salts. The concentration of the phosphate or borate in the aqueous phase is for example 0.5-500 mmol/l and preferably 2.5-100 mmol/l.

The stirrer speed in the polymerization to afford the monodisperse bead polymer is comparatively noncritical and, in contrast with conventional bead polymerization, has no effect on the particle size. Low stirrer speeds sufficient to keep the suspended monomer droplets in suspended form and to promote the removal of the heat of polymerization are employed. Various stirrer types can be used for this task. Particularly suitable stirrers are axial-action gate stirrers.

The volume ratio of encapsulated monomer droplets to aqueous phase is generally 1:0.75 to 1:20, preferably 1:1 to 1:6.

The polymerization temperature for the monodisperse bead polymer is guided by the decomposition temperature of the initiator used. It is generally between 50° C. and 180° C., preferably between 55° C. and 130° C. Polymerization generally takes 0.5 to about 20 hours. It has proven advantageous to employ a temperature program where polymerization is commenced at low temperature, for example 60° C., and the reaction temperature is raised with increasing polymerization conversion. In this way for example the requirement for reliable reaction progress and a high polymerization conversion can be fulfilled very efficiently. After the polymerization, the monodisperse bead polymer is isolated by conventional methods, for example by filtering or decanting, and optionally washed.

Production of the monodisperse bead polymers using the jetting principle or the seed-feed principle is known from the prior art and described for example in U.S. Pat. No. 4,444,961, EP-A 0 046 535, U.S. Pat. No. 4,419,245 or WO 93/12167.

Production of the monodisperse bead polymers is preferably effected with the aid of the jetting principle or the seed-feed principle.

It is preferable when a macroporous, monodisperse bead polymer is produced in process step a).

In process step b) it is preferable when initially the amidomethylation reagent is produced. To this end, for example, a phthalmide or a phthalimide derivative is dissolved in a solvent and admixed with formalin. Subsequently, a bis(phthalimido)ether is formed therefrom by elimination of water. Preferred phthalimide derivatives in the context of the present invention are phthalimide itself or substituted phthalimides, for example methylphthalimide.

However, in process step b.) the phthalmide derivative/the phthallmide could also be reacted with the bead polymer from step a.) in the presence of paraformaldehyde.

The molar ratio of the phthalimide derivatives to the bead polymers in process step b) is generally from 0.15:1 to 1.7:1, other amount of substance ratios also being choosable. The phthalimide derivative is preferably employed in process step b) in an amount of substance ratio of 0.7:1 to 1.45:1.

Formalin is typically employed in excess based on the phthalimide derivative, but other amounts may also be employed. It is preferable when 1.01 to 1.2 mol of formalin are employed per mole of phthalmide derivative.

Inert solvents suitable for swelling the polymer are generally employed in process step b), preferably chlorinated hydrocarbons, more preferably dichloroethane or methylene chloride. However, processes performable without the use of solvents are also conceivable.

In process step b) the bead polymer is condensed with phthalimide derivatives. The catalyst employed here is oleum, sulfuric acid or sulfur trioxide in order therefrom to produce an $SO_3$ adduct of the phthalimide derivative in the inert solvent.

In process step b) the catalyst is typically added in deficiency relative to the phthalimide derivative, though it is also possible to use larger amounts. It is preferable when the molar ratio of the catalyst to the phthalimide derivatives is between 0.1:1 and 0.45:1. It is particularly preferable when the molar ratio of the catalyst to the phthalmide derivatives is between 0.2:1 and 0.4:1.

Process step b) is performed at temperatures between 20° C. and 120° C., preferably 50° C. to 100° C., particularly preferably 60° C. to 90° C.

The elimination of the phthalic acid radical and thus the liberation of the aminomethyl group is effected in process step c) by treatment of the phthalimidomethylated cross-linked bead polymer with aqueous or alcoholic solutions of an alkali metal hydroxide, such as sodium hydroxide or potassium hydroxide, at temperatures between 100° C. and 250° C., preferably 120° C.-190° C. The concentration of the sodium hydroxide solution is generally in the range from 10 to 50 wt %, preferably 20 to 40 wt %. This process makes it possible to produce bead polymers containing aminoalkyl groups.

The thus formed aminomethylated bead polymer is generally washed with demineralized water until free from alkali metal. However, it may also be employed without aftertreatment.

The aminomethylated bead polymer from step c.) already constitutes a weakly basic anion exchanger and may be employed as such. Process step d.) is therefore optional.

However, it is preferable to employ a further process step d.) in which the aminomethylated bead polymer is alkylated.

In process step d.) the production of weakly basic anion exchangers is effected by reaction of the aminomethylated bead polymer from step c.) with alkylating agents.

Preferred alkylating agents in the context of the present invention are alkyl halides, haloalcohols, alkyl sulfates, dialkyl sulfates, alkyl oxides, Leuckart-Wallach reagents, for example and preferably formaldehyde/formic acid mixtures, or combinations of these alkylating agents with one another or in succession.

Particular preference is given to employing chloromethane, ethylene oxide, propylene oxide and the Leuckart-Wallach reagents, for example and preferably formaldehyde/formic acid mixtures, or a combination thereof. Leuckart-Wallach reagents are described for example in Organikum, VEB Deutscher Verlag der Wissenschaften, Berlin 1968, 8th edition, page 479.

Based on the molar amount of nitrogen contained in the aminomethylated bead polymers prepared in process step c.), generally and preferably between 0.1 and 6 mol of alkylating agents, particularly preferably between 1 mol and 4 mol, is employed in process step d.). It is very particularly preferable to employ in process step d.) between 1 mol and 2 mol of alkylating agents in process step c.) based on the molar amount of nitrogen present in the aminomethylated bead polymers prepared in process step c.).

Water or mineral acids are usually used as the suspension medium. However, bases may possibly also be added depending on the desired product. It is preferable to employ water.

Suitable bases optionally include sodium hydroxide solution, potassium hydroxide solution or basic, but not nucleophilic, amines.

Process step d.) is generally and preferably performed at temperatures of 20° C. to 150° C., preferably at temperatures of 40° C. to 110° C. Process step d.) is performed at pressures from standard pressure to 6 bar measured at 20° C., preferably at standard pressure to 4 bar measured at 20° C.

The process described in steps a.) to c.) is known as the phthallmide process. In addition to the phthalimide process, it is also possible to produce an aminomethylated bead polymer by the chloromethylatlon process. According to the chloromethylation process, described for example in EP-A 1 568 660, initially bead polymers—usually styrene/divinylbenzene-based—are produced, chloromethylated and subsequently reacted with amines (Helfferich, Ionenaustauscher, pp. 46-58, Verlag Chemie, Weinheim, 1959) and EP-A 0 481 603). The ion exchanger containing polymer having functional groups of formula (I) may be prepared by the phthalimide process or the chloromethylation process. The ion exchanger according to the invention is preferably produced by the phthalimide process, according to process steps a.) to c.), and said ion exchanger is then optionally alkylated according to step d.) to form a weakly basic anion exchanger with secondary and/or tertiary amino groups.

If the aminomethylated bead polymer is alkylated according to step d.), an ion exchanger where the functional groups of formula (I) are tertiary amino groups is preferably formed. In this case, $R^1$ and $R^2$ are preferably $C_1$-$C_6$-alkyl, particularly preferably methyl. This ion exchanger generally does then still contain secondary and primary amino groups in a smaller amount. The degree of substitution of the ion exchangers comprising polymers having functional groups of formula (I) indicates the ratio of unsubstituted to alkylated amino groups. The degree of substitution can therefore be between 0 and 2. At a degree of substitution of 0, no alkylation would have taken place and the functional groups of formula (I) would be in the form of primary amino groups. At a degree of substitution of 2, al amino groups would be dialkylated. The degree of substitution of the ion exchanger according to the invention is generally and preferably between 0 and 2, preferably between 1 and 2 and very particularly preferably between 1.1 and 1.6.

Preference is therefore given to ion exchangers comprising polymers having functional groups of formula (I) with a degree of substitution of 1.1 to 1.6 and at least one cobalt hexacyanoferrate (II) complex.

It is known that polymers having functional groups of formula (I) are ion exchangers and constitute weakly basic anion exchangers. These ion exchangers are into the ion exchanger according to the invention preferably by loading with divalent transition metal salts in an aqueous medium and in a further step by reaction with at least one alkali metal hexacyanoferrate (II).

Therefore, the invention also comprises a manufacturing process in which
 a) monomer droplets composed of at least one monovinylaromatic compound and at least one polyvinylaromatic compound and at least one initiator are converted into a bead polymer,
 b) the bead polymer from step a.) is phthalmidomethylated with phthalimide derivatives,
 c) the phthalimidomethylated bead polymer from step b.) is converted into aminomethylated bead polymer and optionally
 d) the aminomethylated bead polymer is reacted by alkylation to afford ion exchangers containing secondary and/or tertiary amino groups and
 e) the ion exchanger from step c.) or step d.) is loaded with at least one divalent or trivalent transition metal salt in an aqueous medium and
 f) the transition metal-containing ion exchanger from step e.) is reacted with at least one alkali metal or ammonium hexacyanoferrate.

It is preferable when the reaction in step e.) is effected with a divalent transition metal salt. It is particularly preferable when the reaction in step e.) is effected with a divalent cobalt metal salt. It is preferable when the reaction in step e.) is effected with cobalt (II) sulfate It is preferable when the reaction in step f.) is effected with an alkali metal hexacyanoferrate (II). It is particularly preferable when the reaction in step f.) is effected with an alkali metal hexacyanoferrate (II). It is very particularly preferable when the reaction in step f.) is effected with potassium hexacyanoferrate (II).

Generally and preferably the amount of substance of employed transition metal salt per gram of bead polymer (dry weight) in step d.) is between $10^{-5}$ mol and 0.5 mol. It is particularly preferable when the amount of substance of employed transition metal salt per gram of bead polymer (dry weight) in step d.) is between $10^{-3}$ mol and 0.3 mol.

Generally and preferably the amount of substance ratio of employed alkali metal and ammonium hexacyanoferrate to the transition metal salt is between 10:1 and 1:10. It is particularly preferable when the amount of substance ratio of employed alkali metal and ammonium hexacyanoferrate to the transition metal salt is between 2:1 and 1:2.

The purview of the invention comprehends all the hereinabove and hereinbelow, general or preferred, definitions of radicals, parameters and explanations in any desired combination with one another, including, that is, between the particular general and preferred ranges.

The ion exchangers produced according to the invention are particularly suitable for the adsorption of cesium ions. The invention therefore also comprises the use of the ion exchangers according to the invention for removal and purification of cesium ions. The invention likewise comprises the use of the ion exchanger according to the invention for removal of cesium ions from waste water and cooling water.

The ion exchangers according to the invention are suitable for adsorption of cesium ions and have a high cesium capacity. In addition, the ion exchangers according to the invention are very stable and withstand high mechanical stresses. They therefore likewise exhibit the abrasion resistance necessary for industrial processes.

The following examples serve only to describe the invention and are not intended to limit it.

EXAMPLES

Example 1

1a) Production of a Monodisperse, Macroporous Bead Polymer Based on Styrene, Divinylbenzene and Ethyistyrene A 10 l glass reactor is initially charged with 3000 g of demineralized water, and a solution of 10 g of gelatin, 16 g of disodium hydrogenphosphate dodecahydrate and 0.73 g of resorcinol in 320 g of deionized water is added and commixed. The mixture is temperature-controlled to 25° C. Subsequently, with stirring, a mixture of 3200 g of microencapsulated monomer droplets having a narrow particle size distribution composed of 3.6 wt % of divinylbenzene and 0.9 wt % of ethyistyrene (employed in the form of a commercial isomer mixture of divinylbenzene and ethyistyrene comprising 80% divinylbenzene), 0.5 wt % of dibenzoyl peroxide, 56.2 wt % of styrene and 38.8 wt % of isododecane is added, wherein the microcapsule consists of a formaldehyde-hardened complex coacervate composed of gelatin and a copolymer of acrylamide and acrylic acid, and 3200 g of aqueous phase having a pH of 12 are added.

The mixture is stirred and polymerized to completion by increasing the temperature in accordance with a temperature program commencing at 25° C. and terminating at 95° C. The mixture is cooled, washed over a 32 µm sieve and then dried at 80° C. under reduced pressure. 1893 g of a spherical polymer having a narrow particle size distribution and a smooth surface are obtained.

The polymer is chalky white in appearance and has a bulk density of about 370 g/l.

1b) Production of an Amidomethylated Bead Polymer 2218 ml of dichloroethane, 823 g of phthalimide and 569 g of 30 wt % formalin are initially charged at room temperature. The pH of the suspension is adjusted to 5.5 to 6 with sodium hydroxide solution. The water is then removed by distillation. This is followed by metered addition of 60.4 g of sulfuric acid. The water formed is removed by distillation. The batch is cooled. At 30° C., 255 g of 65% oleum followed by 424 g of monodisperse bead polymer produced according to process step 1a) are metered in. The suspension is heated to 70° C. and stirred at this temperature for a further 6 hours. The reaction broth is drawn off, demineralized water is metered in and residual dichloroethane is removed by distillation.

Yield of amidomethylated bead polymer. 2580 ml

1c) Production of an Aminomethylated Bead Polymer

Metered into 2545 ml of amidomethylated bead polymer from 1b) at room temperature are 1454 g of 50 wt % sodium hydroxide solution and 1340 ml of demineralized water. The suspension is heated to 180° C. over 2 hours and stirred at this temperature for 8 hours.

The obtained bead polymer is washed with demineralized water.

Yield of aminomethylated bead polymer: 2155 ml

Determination of amount of basic groups: 2.41 mol/liter of resin

1d) Production of a Bead Polymer Having Tertiary Amino Groups

In a reactor 450 ml of deionized water, 900 ml of aminomethylated bead polymer from 1c) and 270 g of 30 wt % formalin solution are initially charged at room temperature. The suspension is heated to 40° C. The pH of the suspension is adjusted to pH 3 by metered addition of 85 wt % of formic acid. Over 2 hours the suspension is heated to reflux temperature (97° C.). During this time, the pH is maintained at 3.0 by metered addition of formic acid. Once reflux temperature has been reached the pH is adjusted to pH 2 initially by metered addition of formic acid, then by metered addition of 50 wt % sulfuric acid. The mixture is stirred at pH 2 for a further 30 minutes. A further 50 wt % sulfuric acid is then metered in and the pH is adjusted to pH 1. At pH 1 and reflux temperature stirring is continued for a further 10 hours.

The batch is cooled, the resin is filtered-off on a sieve, washed with demineralized water and subsequently 2500 ml of 4 wt % aqueous sodium hydroxide solution are filtered through the resin. The resin is then washed with water.

Volume yield: 965 ml

Determination of amount of basic groups: 2.22 mol/liter of resin

The degree of substitution is 1.3.

Example 2

Production of a Cesium-Selective Ion Exchanger Based on an Aminomethylated Bead Polymer 19.7 g (0.07 mol) of cobalt(II) sulfate heptahydrate are dissolved in 350 mil demineralized water. 350 ml of aminomethylated bead polymer (0.625 mol) from Example 1d) are then added with stirring and stirred at room temperature for 1 h. A solution of 44.4 g (0.105 mol) of potassium hexacyanoferrate (II) trihydrate in 350 ml of deionized water is then added over one hour. The mixture is adjusted to pH=7 with 78% sulfuric acid and the suspension is stirred at pH=7 for 7 h.

The suspension is placed on a sieve, the remaining reaction solution is allowed to run off and the ion exchanger is washed out with demineralized water on the sieve.

Yield: 375 ml

Cobalt content: 3.8 wt % (dry weight)

Iron content: 5.5 wt % (dry weight)

Comparative Example 1

(Use of a Strongly Basic Anion Exchanger Having Quaternary Ammonium Groups)

Production of a Cesium-Selective Ion Exchanger Based on a Quaternized Aminomethylated Bead Polymer 44.4 g (0.105 mol) of potassium hexacyanoferrate (II) trihydrate are dissolved in 350 ml of water. 521 ml of a strongly basic anion exchanger (0.625 mol) are then added with stirring and the mixture is shaken at room temperature for 5 h. The suspension is placed on a sieve, the remaining reaction solution is allowed to run off and the ion exchanger is washed out with demineralized water on the sieve. The resin is then added to a solution of 19.7 g (0.07 mol) of cobalt (II) sulfate heptahydrate in 350 ml of deionized water and shaken at room temperature for 24 h. The suspension is placed on a sieve, the remaining reaction solution is allowed to run off and the ion exchanger is washed out with demineralized water on the sieve.

Yield: 470 ml

Cobalt content: 2.1 wt % (dry weight)

Iron content: 2.9 wt % (dry weight)

Comparative Example 2

(Use of a Weakly Basic Anion Exchanger with Tertiary Amine Groups)

Production of a Cesium-Selective Ion Exchanger Based on a Weakly Basic, Heterodisperse Anion Exchanger Having Tertiary Amine Groups (IRA 96)

11.2 g (0.04 mol) of cobalt(II) sulfate heptahydrate are dissolved in 200 mil demineralized water. 200 ml of IRA 96 (0.28 mol) are then added with stirring and the mixture is stirred at room temperature for 1 h. A solution of 25.3 g (0.06 mol) of potassium hexacyanoferrate (II) trihydrate in 200 ml of deionized water is then added over one hour. The mixture is adjusted to pH=7 with 50% strength sulfuric acid and the suspension is stirred at pH=7 for 5 h.

The suspension is placed on a sieve, the remaining reaction solution is allowed to run off and the ion exchanger is washed out with demineralized water on the sieve.

Yield: 210 ml

Cobalt content: 0.75 wt % (dry weight)

Iron content: 3.4 wt % (dry weight)

Example 3 Determination of Uptake Capacity for Cesium

To produce a Cs stock solution 139.4 mg of CsCl (22 mg/l of cesium), 276.6 mg of $CaCl_2$ (20 mg/l of calcium) and 200 g of NaCl (40 g/l of cooking salt) are dissolved in 5 l of DM water, the pH is adjusted to pH=7 with sodium hydroxide solution.

In each case 500 mg of the carefully patted-dry resin are added to 800 ml of the stock solution made up hereinabove. The mixture is shaken at room temperature and at 130 rpm for 24 h. The cesium concentration in the solution is then determined by atomic absorption spectroscopy (AAS).

TABLE 1

| Resin | Cs start concentration [mg/l] | Cs end concentration [mg/l] | Separation [%] |
| --- | --- | --- | --- |
| Example 2 | 22 | 0.6 | 97 |
| Comparative example 1 | 22 | 7.8 | 65 |

It is apparent from the results of Table 1 that the resins according to the invention have an uptake capacity for cesium ions which is up to 32% higher than that of strongly basic anion exchangers having quaternary ammonium groups such as are disclosed for example in Journal of Hazardous Materials, 2009, Vol. 166, pp. 1148-1153.

In addition, it is apparent from Comparative example 2 that weakly basic tertiary anion exchangers which have a degree of substitution above 85% and have been prepared using the chloromethylation process, for example IRA 96, take up cobalt (II) ions only in small amounts. By comparison the resin according to the invention takes up almost 5 times more cobalt (II) ions.

Test Methods

Determination of Amount of Basic Groups 100 ml of the aminomethylated bead polymer are shaken down in a tamping volumeter and subsequently washed into a glass column with demineralized water. 1000 ml of 2 wt % sodium hydroxide solution are passed through the column over 1 hour and 40 minutes.

Demineralized water is then passed through until 100 ml of eluate admixed with phenolphthalein have a consumption of 0.1 N (0.1 normal) hydrochloric acid of not more than 0.05 ml.

50 ml of this resin are admixed in a beaker with 50 ml of demineralized water and 100 ml of 1 N hydrochloric acid. The suspension is stirred for 30 minutes and then transferred into a glass column. The liquid is drained off. A further 100 ml of 1 N hydrochloric acid are filtered through the resin for 20 minutes. 200 ml of methanol are then filtered through. All of the eluates are collected and combined and titrated with 1 N sodium hydroxide solution against methyl orange.

The number of aminomethyl groups in 1 liter of aminomethylated resin computes according to the following formula: $(200-V) \times 20$=mol of aminomethyl groups per liter of resin, where V is the volume of the 1 N sodium hydroxide solution consumed in the titration.

What is claimed is:

1. An ion exchanger comprising:
polymers having functional groups of formula (I)

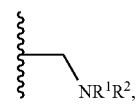

(I)

wherein:

⌇ represents a polystyrene copolymer scaffold; and $R^1$ and $R^2$ are identical or different and independently of one another represent methyl and/or ethyl, and where a degree of substitution as indicated by a ratio of unsubstituted to alkylated amino groups is 1.1 to 1.6, and at least one cobalthexacyanoferrate complex.

2. The ion exchanger as claimed in claim 1, wherein the ion exchanger contains cobalthexacyanoferrate complex in an amount of 0.5 wt % to 10 wt % based on the dry weight of the ion exchanger.

3. The ion exchanger as claimed in claim 1, wherein the ion exchanger has an iron content of 0.5 wt % to 10 wt % based on the dry weight of the ion exchanger.

4. The ion exchanger as claimed in claim 1, wherein the polystyrene copolymer scaffold represents a styrene/divinylbenzene crosslinked copolymer.

5. The ion exchanger as claimed in claim 1, wherein the polymer of the ion exchanger is macroporous.

6. The ion exchanger as claimed in claim 1, wherein the cobalthexacyanoferrate complex is cobalt hexacyanoferrate (II) complex.

7. A process for producing the ion exchangers according to claim 1, the process comprising contacting an ion exchanger containing polymer having functional groups of formula (I)

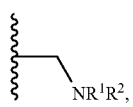

(I)

wherein ▮ $^a$ represents a polystyrene copolymer scaffold, and $R^1$ and $R^2$ are identical or different and independently of one another represent methyl and/or ethyl, with at least one transition cobalt salt, and at least one alkali metal or ammonium hexacyanoferrate in an aqueous medium and wherein and a degree of substitution indicated by a ratio of unsubstituted to alkylated amino groups is 1.1 to 1.6.

8. The process for producing the ion exchanger as claimed in claim 7, wherein the process comprises:
a) converting monomer droplets composed of at least one monovinylaromatic compound and at least one polyvinylaromatic compound and at least one initiator into a bead polymer,
b) phthalimidomethylating the bead polymer from step a) with phthalimide derivatives,
c) converting the phthalimidomethylated bead polymer from step b) into an aminomethylated bead polymer,
d) optionally reacting the aminomethylated bead polymer by alkylation to afford ion exchangers having tertiary amino groups,
e) loading the ion exchanger from step c) or step d) with at least one divalent or trivalent cobalt metal salt in an aqueous medium to produce a transition metal-containing ion exchanger, and
f) reacting the transition cobalt-metal-containing ion exchanger from step e) with at least one alkali metal or ammonium hexacyanoferrate.

9. The process for producing the ion exchanger as claimed in claim 7, wherein the transition metal salts in step e) are selected form the group consisting of cobalt (II) sulfate, cobalt (II) chloride, cobalt (II) bromide, cobalt (III) sulfate, cobalt (III) chloride, cobalt (III) bromide, cobalt (II) nitrate, cobalt (III) nitrate, and hydrates and mixtures thereof.

10. The process for producing the ion exchanger as claimed in claim 7, wherein the alkali metal hexacyanoferrate in step f.) is selected from the group consisting of potassium hexacyanoferrate (II), potassium hexacyanoferrate (III), sodium hexacyanoferrate (II), sodium hexacyanoferrate (III), and hydrates and mixtures thereof.

11. The use of the ion exchangers as claimed in claim 1 for removal and purification of cesium ions.

* * * * *